May 29, 1951        C. J. LYDICK        2,554,865

BICYCLE BASKET

Filed Nov. 8, 1946

INVENTOR.
Clarence J. Lydick
BY
ATTORNEY.

Patented May 29, 1951

2,554,865

UNITED STATES PATENT OFFICE 2,554,865

BICYCLE BASKET

Clarence J. Lydick, Wichita, Kans.

Application November 8, 1946, Serial No. 708,690

2 Claims. (Cl. 224—36)

This invention relates to improvements in bicycle baskets and refers more particularly to a wire basket or container, attached to a bicycle or motorcycle ahead or in front of the handle bars.

The novelty in the invention resides primarily in the manner of supporting the basket by its rim between the handle bars and the front wheel axle, and the hand rail arrangement around the rear portion of the basket for increasing its capacity or providing a gripping rod for a child being carried in the basket.

An object of the invention, therefore, is to provide a wire container having a rim rod around its upper edge and a relatively rigid support in the form of clamps between the rim rod and the handle bars.

Another object is to provide truss or brace rods between the ends of the front wheel axle and the rim rod at the front edge of the basket.

Another object is to provide a hand rail affixed at its ends to the sides of the rim rod and surrounding the rear portion of the basket in spaced relation to the rim rod and somewhat thereabove, providing supplemental reinforcement at the rear of the basket due to its attachment to the handle bar clamping members.

A further object is to provide supporting struts or brace rods easily detachable from the front portion of the rim rod of the basket.

Other and further objects of the invention will appear from the following description.

Figure 1:
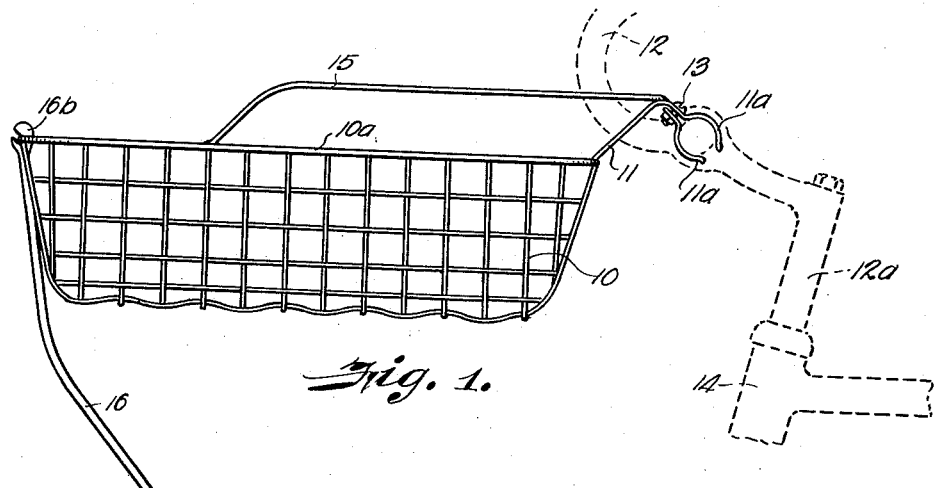
Figure 2:
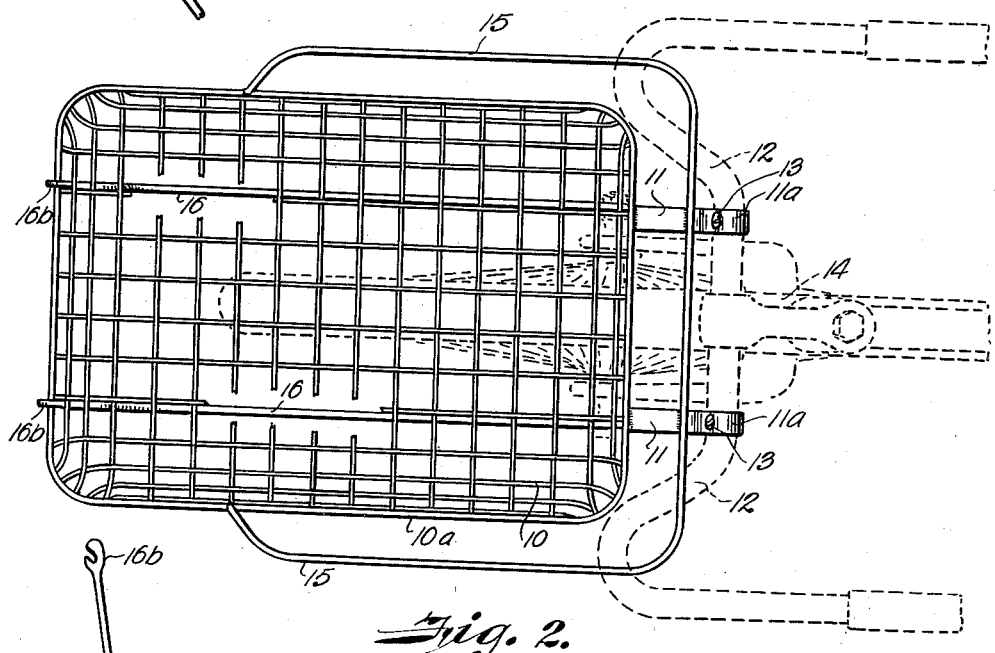
Figure 3:
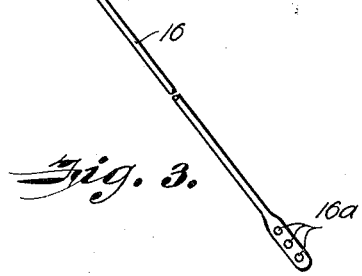

In the accompanying drawings which form a part of the instant specification and are to be read in conjunction therewith, and in which like reference numerals indicate like parts in the various views, Fig. 1 is a side view of the basket with the brace rods broken away and the handle bars and a portion of the bicycle shown in dotted lines, Fig. 2 is a plan view of the basket with the front portion of the bicycle shown in dotted lines, and Fig. 3 is a detail of one of the brace rods.

Referring to the drawings, at 10 is shown a wire container or basket having a rim rod 10a surrounding its upper edge. Fixedly attached to the rear side of the basket at the rim rod are metal straps or clamps 11 which have gripping portions 11a detachably affixed to the handle bars 12 by means of screw bolts 13. The vertical portion 12a of the handle bars fits into the bicycle frame 14 shown in dotted lines in the drawing. The ends of hand rail 15 are welded or otherwise fixedly attached to the rim rod at the sides of the basket and somewhat forward of its center. This rail surrounds the basket at the rear, being spaced apart somewhat from the rim rod and running substantially parallel thereto. At the back of the basket it is affixed by welding or otherwise to the clamps 11, its attachment to the rim rod and to the clamps providing a relatively rigid structure.

Extending from the ends of the axle of the front wheel of the bicycle are a pair of struts or brace rods 16 detailed in Fig. 3. The lower extremities of these rods are flattened and perforated by holes 16a. These holes fit onto the end of the axle outside of the forks of the frame and provide vertical adjustment of the front edge of the basket. The upper ends of the rods likewise have flattened portions slotted to form hooks 16b with the hook shaped member directed forwardly. These hooks at the ends of the rods engage the rim rod at the front upper edge of the basket and with the clamps 11 support the basket in a horizontal position. By hanging the basket between the handle bars and brace rods from its upper rim, there is provided a more rigid support than when the basket is supported from the bottom. In other words, the load being carried in the basket is better balanced and adjusted to the vehicle when the basket is supported from its rim and is hung between the supports, than when mounted upon them. The hand rail, attached as it is to the sides of the rim rod and to the clamps at the rear, affords a steadying support against tendencies toward lateral tipping. It also provides an enlargement at the rear of the basket increasing its carrying capacity, and is a convenient hand rail for a child who may be transported in the basket.

It is recognized that innumerable types of supports have been devised for bicycle baskets carried in front of the handle bars and supported either on the forks of the frame or upon the axle of the front wheel. It is believed, however, that the novel type of supports shown, including the clamps, and manner of attachment to the rear side of the rim rod and to the hand rail, as well as the elongated brace rods extending from the axle to the front rim, are unique improvements over what has gone before.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A bicycle basket comprising a basket portion having a rim rod surrounding the upper open edge thereof, clamps secured to a side portion of the rim rod and extending upwardly and outwardly therefrom, and a hand rail attached to the rim rod at spaced points thereon and paralleling the rim rod in spaced relation thereto around said side portion and above the rim rod, said hand rail being fixedly attached to at least one of said clamps at a point spaced above the rim rod.

2. A bicycle basket comprising a basket portion having a rim rod surrounding the upper open edge thereof, clamps secured to a side portion of the rim rod and extending outwardly therefrom, and brace rods extending upwardly beneath the basket, each of said brace rods having an upwardly and outwardly extending flattened portion having outwardly opening slots to receive the rim rod at points spaced from said clamps, whereby the basket is supported from the rim rod.

CLARENCE J. LYDICK.

REFERENCES CITED

The following references are of record in the file of this patent:

UNITED STATES PATENTS

| Number | Name | Date |
|---|---|---|
| 313,129 | Tipney | Mar. 3, 1885 |
| 595,240 | Lincoln | Dec. 7, 1897 |
| 636,401 | Garrett | Nov. 7, 1899 |
| 2,168,916 | Pawsat | Aug. 8, 1939 |
| 2,183,822 | Pawsat | Dec. 19, 1939 |
| 2,272,524 | Johnson | Feb. 10, 1942 |

FOREIGN PATENTS

| Number | Country | Date |
|---|---|---|
| 116,240 | Great Britain | June 6, 1918 |